United States Patent [19]

Eloy

[11] 4,320,295
[45] Mar. 16, 1982

[54] PANORAMIC ION DETECTOR

[75] Inventor: Jean-Francois Eloy, Saint-Ismier, France

[73] Assignee: Commissariat a l'Energie Atomique, Paris, France

[21] Appl. No.: 111,116

[22] Filed: Jan. 10, 1980

[30] Foreign Application Priority Data

Jan. 23, 1979 [FR] France .................................. 79 01632

[51] Int. Cl.³ .......................... H01J 3/14; B01D 59/44
[52] U.S. Cl. ................................. 250/281; 250/361 R; 250/397
[58] Field of Search ................ 313/360, 363; 250/281, 250/361, 287, 282, 397

[56] References Cited

U.S. PATENT DOCUMENTS

| | | | |
|---|---|---|---|
| 2,422,264 | 6/1947 | Seaman | 250/281 |
| 2,720,593 | 10/1955 | Richards et al. | 250/281 |
| 2,944,146 | 7/1960 | Schultz | 313/359 |
| 3,277,297 | 10/1966 | Forrester et al. | 250/483 |
| 3,898,456 | 8/1975 | Dietz | 250/281 |

OTHER PUBLICATIONS

Journal of Physics & Engineering, vol. 3, No. 8, Aug. 1970, pp.-"Numerical-Conversion Detector" by Suumeijer et al.
"A Large Aperture—Positive Ions" by Ridley Nuclear Inst. & Methods, vol. 14 (1961) pp. 231-236.

Primary Examiner—Harold A. Dixon
Attorney, Agent, or Firm—Millard & Cox

[57] ABSTRACT

Panoramic detector for ions spatially distributed in different beams, wherein it comprises a diaphragm with plane symmetry having an opening permitting the passage of said beams, said diaphragm being brought into a given potential, an accelerating electrode having an opening facing the opening in the diaphragm, said accelerating electrode having a plane symmetry and being brought to a negative potential compared with that of the diaphragm and a plane electrode facing the accelerating electrode and brought to a negative potential compared with that of the diaphragm, the absolute value of the potential of the plane electrode being greater than the absolute value of the potential of the accelerating electrode.

5 Claims, 1 Drawing Figure

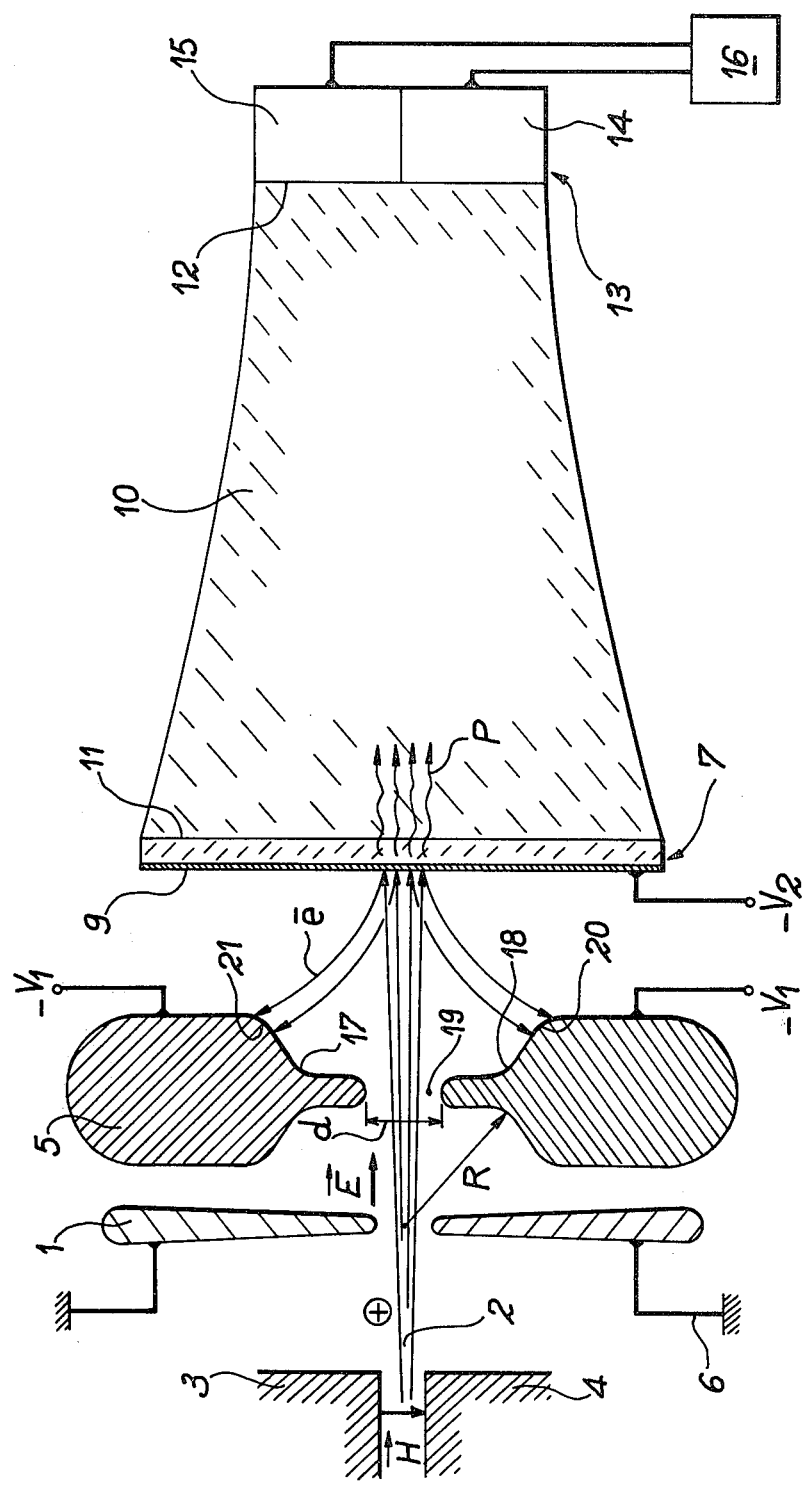

PANORAMIC ION DETECTOR

BACKGROUND OF THE INVENTION

The present invention relates to a panoramic ion detector, which can be used for the detection of charged particles, particularly in mass spectrography.

French Patent Application No. EN 77 35185 of Nov. 23rd 1977 in the name of the present Applicant, describes a panoramic ion detector which converts ions into electrons, whilst maintaining the same spatial distribution for the electron beams formed as for the ion beams to be analysed.

This type of detector comprises a diaphragm with plane symmetry brought to earth potential and having an opening permitting the passage of ion beams, an electrode for converting ions into electrons and having an opening facing the opening of the diaphragm, said conversion electrode having a plane symmetry and brought to a negative potential compared with earth potential and a plane electrode facing the conversion electrode and brought to a positive potential compared with the potential of the conversion electrode.

This type of detector is intended to operate in numerous cases in the presence of a magnetic field and in particular a magnetic stray field of the magnetic deviation and focusing sector of a mass spectrography. Whereas the ion beams are relatively little disturbed in their geometrical configuration by the presence of this magnetic field, the secondary electrons emitted by the conversion electrode are extremely sensitive to this field. They have a tendency to spread along divergent paths and the distribution of the secondary electron beams resulting from the incident ion beams corresponds very poorly with that of the ion beams, which is a major disadvantage in a mass spectrometer with separation of the masses by magnetic field.

To obviate this disadvantage, the invention according to the above-mentioned French Patent Application proposed giving the conversion electrode and more specifically downstream face thereof an appropriate shape. As a result of this concave shape in which the surface of the electrode is substantially perpendicular to the magnetic field lines, the dispersions of the dispersions of the electron paths are minimised and the distribution of the electron beams substantially corresponds to that of the ion beams.

BRIEF SUMMARY OF THE INVENTION

In the detector according to the present invention, a different procedure is used. There is no ion-electron conversion and the sensitivity to ions of scintillators is utilised. The ion beams are accelerated in such a way that they retain their spatial distribution in the presence of a magnetic field applied. This objective is achieved by avoiding the divergence of the ion beams during their acceleration.

The invention therefore relates to a panoramic detector for ions spatially distributed in different beams, wherein it comprises a diaphragm with plane symmetry having an opening permitting the passage of said beams, said diaphragm being brought to a given potential, an accelerating electrode having an opening facing the opening in the diaphragm, said accelerating electrode having a plane symmetry and being brought to a negative potential compared with that of the diaphragm and a plane electrode facing the accelerating electrode and extending across the aperture in said accelerating electrode so that ions passing through the aperture in said accelerating electrode will impinge upon said plane electrode, said plane electrode being brought to a negative potential compared with that of the diaphragm, the absolute value of the potential of the plane electrode being greater than the absolute value of the potential of the accelerating electrode.

According to an advantageous feature of the invention the edges of the opening in the accelerating electrode facing the plane electrode have a concave shape suitable for retaining the spatial distribution of the ion beams to be detected in the presence of a magnetic field applied.

The concave shape of these edges facing the diaphragm is suitable for the post-acceleration of the incident ion beams without said post-acceleration increasing the divergence of the beams after traversing the opening in the accelerating electrode. The concave shape of the edges of the opening facing the plane electrode make it possible to prevent the beams of secondary electrons formed during the impact of the ions on the plane electrode from disturbing the other ion beams to be detected, which would arrive on either side of the secondary electron emission position. For this purpose the appropriate shape of the accelerating electrode makes it possible to capture the secondary electrons laterally with respect to the plane of symmetry of the accelerating electrode. As a result, the spatial distribution of the ion beams and the measurement of the respective charge quantities are respected when the latter strike the plane electrode in the presence of a magnetic field applied.

The invention also relates to an ion detector belonging to a single beam, wherein it comprises a diaphragm having an opening permitting the passage of said beam, this diaphragm being raised to earth potential, an ion accelerating electrode having an opening facing the opening in the diaphragm, this accelerating electrode being brought to a negative potential compared with earth potential and a plane electrode facing the accelerating electrode and brought to a negative potential compared with the potential of the diaphragm, the absolute value of the potential of this plane electrode being greater than the absolute value of the potential of the accelerating electrode.

DESCRIPTION OF THE DRAWING AND PREFERRED EMBODIMENTS

The invention is described in greater detail hereinafter relative to non-limitative embodiments and the attached drawing.

The detector shown in the drawing comprises a scintillator and one-piece means for conducting photons to a photon detector, so that it can be used in a time of-flight mass spectrograph with a transit time like that described in French Patent Application No. 77 34271 filed on Nov. 15th 1977 in the name of the present applicant.

As can be gathered from the drawing, the detector has an ion intake diaphragm 1. These ions are shown in the drawing in the form of a beam 2, emitted for example in a mass spectrograph of which only the pole pieces 3 and 4 of an electromagnet permitting the magnetic analysis of the ions from the same ion source are shown. The magnetic field H produced by the electromagnet is shown by an arrow in the drawing. Each of the beams formed from ions of the same mass is substantially contained in a median plane of pole pieces 3, 4 perpendicular to the plane of the drawing. The detector also has ion accelerating means, which are electrodes having a continuous structure and plane symmetry. The diaphragm 1 is brought to a given potential 6, whilst the ion accelerating electrodes 5 are brought to a potential $-V_1$, which is negative compared with the above-mentioned potentials. These accelerating electrodes have a generally planar shape. They are shown in cross-section in the drawing and are made from a metal alloy such as a copper and beryllium alloy having an ion-electron conversion coefficient which is greater than unity.

The electric field E between diaphragm 1 and the accelerating electrodes 5 has a direction which is generally parallel to the ion beam. Its intensity is such that the ions pass between the edges of the electrodes and strike a plane electrode 9 raised to a negative potential $-V_2$ compared with earth potential. Electrode 9 covers a scintillator 7 permitting a conversion of the ions into photons. Scintillator 7 has a planar structure and is made from a plastic material, being covered by electrode 9 made from a thin sheet of aluminium facing the accelerating electrodes belonging to the panoramic detector. This sheet is transparent to ions which could thus cause the scintillator to react. The scintillator can be of type NE 102A, marketed by the British Company/"Nuclear Enterprise Limited" (Edinburgh).

As an example, the negative potential $-V_1$ to which are raised the ion accelerating electrodes is of the order of 0 to $-5$ kV. The negative potential $-V_2$ to which is raised the plane electrode 9 of the scintillator is of the order of 0 to $-10$ kV. The thin sheet of aluminium 9 which covers the plastic scintillator 7 has a thickness which is equal to or below 200 Å. The absolute value of the potential $-V_1$ is obviously below the absolute value of potential $-V_2$.

In the present embodiment, scintillator 7 faces the means for the processing of the electron signals transmitted in the various zones of plane electrode 9 as a result of ion impacts. The processing means comprise means 10 for the conduction of the photons emitted by the scintillator. When the detector is intended for the time-of-flight mass spectrograph described in the abovementioned French Patent Application, said photon conduction means have, for example, a one-piece construction and can for example be made from a colourless, transparent artificial resin. This artificial resin is a methyl methacrylate polymer, best known under the trade name Plexiglass. The inlet face 11 of the said conduction means faces the scintillator, whilst their outlet face 12 faces a photon detector 13 belonging to the processing means. In the present embodiment, photon detector 13 is constituted by two photomultipliers 14, 15, one having a relatively low gain and the other a very high gain, making it possible for the first to process the ions corresponding to not very intense beams and the second to process the ions corresponding to the intense beams. The output signals of the photomultipliers are applied to means 16 for the analysis and visual display of the photon spectrum. The analysis means are flight time measuring means and the visual display means can either be a cathode tube oscilloscope or an analog - digital converter with a display.

The photon conduction means 10 having a one-piece construction and make it possible to transmit the photons from the scintillator to the photomultiplier have a convergent shape in the direction of the photomultipliers.

Thus, as a result of the detector according to the invention, the ions are converted into photons in a continuous manner. There is no spatial discontinuity in the detection of the ions. In the present embodiment, there is also no spatial discontinuity in the detection of the photons.

The ions to be collected and detected are post-accelerated by an electric field E applied between the diaphragm 1 and the ion accelerating electrodes 5. When the ions reach this space, they strike the surface of plane electrode 9 disposed on scintillator 7 with a high kinetic energy. The ions which strike the surface of the plane electrode with a certain kinetic energy detach the secondary electrodes $e^-$ from said electrodes. These secondary electrons are accelerated and collected laterally at 20, 21 by the ion accelerating electrode. The impacts of the ions produce scintillation phenomena in the scintillator from which the emission of the photons results.

The edges 17, 18 of opening 19 between the accelerating electrodes and which face the plane electrode 9 have a concave shape in such a way that, due to the electric field $\overline{E}$ created between the accelerating electrodes and the plane electrode 9 the spatial distribution of each ion beam is respected during the ion-photon conversion within the detector. The ions on leaving the accelerating electrodes are subject to the action of the magnetic field H, whose field lines extend up to this zone, but accelerated by the electric field in the direction of electrode 9 of the scintillator they are only deflected to a negligible extent by the magnetic field. However, the electric field lines on leaving the accelerating electrode have a direction such that they make it possible to laterally collect at 20, 21 the electrons initially emitted in all directions. As a result, the trajectories of the ions are no longer detrimentally influenced by the secondary electron emission. If d designates the width of opening 19 between the accelerating electrodes and R the radius of the concave circular portion of said electrodes, it is preferable to choose $R \geq 4d$ to prevent any divergence of the ion beams in the space between electrodes 1 and 5. However, it is obvious that this relationship is not limitative and essentially depends on the intensity of the ion beam and the potentials applied to the different electrodes. It is suitable for beam intensity values of $10^{-3}$ to $10^{-6}$ A and apply potential values of $V_D=0$, $V_A=5$ kV and $V_E=-9$ kV ($V_D$, $V_A$ and $V_E$ being respectively the potentials of diaphragm 1, the electrode 5 and the electrode 9). In this case, the outlet face of electrode 5 can be symmetrical to the inlet face relative to the median plane.

The photon conduction means 10 have their face 11 directly in contact with the plastic support 8 of the scintillator on a surface equivalent to that of the plane electrode. The photons emitted by the scintillator are channeled and converge on an appropriate opening window of each of the photomultipliers 14, 15 in such a way as to permit the reading of all the light information, due to the visual display means 16 linked with said photon detectors. The one-piece light guide 10 permits a spatial mixing and a differential transit time processing of all the photon information. As a result, it is possible to simultaneously read the photon information due to one or more photomultipliers having different gains, such as 14, 15 arranged on the same light guide.

The detector described hereinbefore has the advantage of supplying a very rapid analytical response. In mass spectrography, this detector permits a simplified interpretation of the mass spectrum. Its detection limit is approximately 1000 times greater than that of a photographic detector. Moreover, the voltage applied between the diaphragm and the accelerating electrode makes it possible to prevent the electrons producing parasitic phenomena on the scintillator and thus creating parasitic data.

This arrangement and the resulting advantage is not limited to the application to ion detectors which are sensitive to a plurality of ion beams and can also be applied to a monodetector. In the latter case, the diaphragm and the accelerating electrodes have a circular opening and the electrode and the scintillator have a generally disk-like configuration for example.

It is obvious that in the detector described hereinbefore the means used could have been replaced by equivalent means without passing beyond the scope of the invention. In particular, the photon conduction means, which have been chosen so as to have a onepiece structure suitable for a time-of-flight mass spectrograph according to the French Patent Application referred to hereinbefore, could for example be replaced by a plurality of optical fibres. This construction is moresuitable for the conventional mass spectrograph with spatial separation by magnetic field. However, it also permits the application of the detector to the time-of-flight mass spectrograph described in the above-mentioned patent application. In the latter case, the spatial separation of the light beams serves no useful purpose and if a plurality of photomultipliers with different gains is used, it is necessary for each scintillator zone corresponding to an ion beam of given mass is joined to the inlet face of each of the photomultipliers.

What is claimed is:

1. A panoramic detector for ions spatially distributed in different beams, said detector comprising a diaphragm with plane symmetry having an opening and brought to a given potential, an accelerating electrode having an opening facing the opening in the diaphragm, said accelerating electrode having a plane symmetry and being brought to a negative potential compared with that of the diaphragm, a plane electrode facing the accelerating electrode and extending across the aperture in said accelerating electrode so that ions passing through the aperture in said accelerating electrode will impinge on said plane electrode, said plane electrode being brought to a negative potential compared with that of the diaphragm, the absolute value of the potential of the plane electrode being greater than the absolute value of the potential of the accelerating electrode and a plurality of processing means for processing electron signals emitted from differing zones of the plane electrode as a result of ion impacts, said plurality of processing means comprising a scintillator and a plurality of light guides, each associated with one of the zones of the scintillator, juxtaposed along the direction of said plane of symmetry.

2. A detector according to claim 1, wherein the edges of the opening in the accelerating electrode facing the plane electrode have a concave shape suitable for retaining the spatial distribution of the ion beams to be detected in the presence of a magnetic field applied.

3. A detector according to claim 1, wherein said plurality of processing means also comprise a plurality of photomultipliers, each of which is associated with one of the light guides.

4. A panoramic detector for ions spatially distributed in different beams, wherein it comprises a diaphragm with plane symmetry having an opening being brought into a given potential, an accelerating electrode having an opening facing the opening in the diaphragm, said accelerating electrode having a plane symmetry and being brought to a negative potential compared with that of the diaphragm and a plane electrode facing the accelerating electrode and extending across the aperture in said accelerating electrode so that ions passing through the aperture in said accelerating electrode will impinge upon said plane electrode, said plane electrode being brought to a negative potential compared with that of the diaphragm, the absolute value of the potential of the plane electrode being greater than the absolute value of the potential of the plane electrode being greater than the absolute value of the potential of the accelerating electrode and the portions of the accelerating electrode surrounding the opening therein having a concave surface facing the plane electrode so that secondary electrons emitted from the plane electrodes are collected by the concave surface of the accelerating electrode.

5. A detector according to claim 4, wherein said concave surface has substantially the form of a portion of the surface of the sphere, said sphere having a radius not less than about four times the diameter of the opening in the accelerating electrode.

* * * * *